US007118254B2

(12) United States Patent
Czech

(10) Patent No.: US 7,118,254 B2
(45) Date of Patent: Oct. 10, 2006

(54) RECESSED DOWNLIGHT MOUNTING FIXTURE

(75) Inventor: Kenneth Czech, North Dartmouth, MA (US)

(73) Assignee: Genlyte Thomas Group, LLC, Louisville, KY (US)

( * ) Notice: Subject to any disclaimer, the term of this patent is extended or adjusted under 35 U.S.C. 154(b) by 254 days.

(21) Appl. No.: 10/827,825

(22) Filed: Apr. 20, 2004

(65) Prior Publication Data

US 2005/0231954 A1 Oct. 20, 2005

(51) Int. Cl.
*F21V 15/00* (2006.01)
*B23P 19/00* (2006.01)

(52) U.S. Cl. ...................... 362/365; 362/306; 362/364; 362/370; 362/371; 362/406; 362/147; 362/296; 362/396; 200/297; 29/739; 29/729

(58) Field of Classification Search ................. 174/63, 174/52.1, 50; 362/147, 296, 306, 364, 370, 362/371, 396, 406, 365, 148; 29/33 M, 739, 29/729; 248/57; 200/297; 220/3.2
See application file for complete search history.

(56) References Cited

U.S. PATENT DOCUMENTS 1,763,160 A 6/1930 Knight
2,214,968 A 9/1940 MacMillen
2,732,090 A 1/1956 Karlin
2,809,763 A 10/1957 Clark
4,237,403 A 12/1980 Davis
4,408,262 A 10/1983 Kusmer
4,438,859 A 3/1984 Solek
4,576,302 A 3/1986 Smolik
5,034,859 A 7/1991 Gawad
5,075,831 A 12/1991 Stringer et al.
5,408,045 A 4/1995 Jorgensen et al.
5,480,053 A 1/1996 Jorgensen
5,664,869 A * 9/1997 Bitton ........................ 362/147
5,680,947 A * 10/1997 Jorgensen ................... 220/3.9
6,123,435 A 9/2000 Wang
6,283,430 B1 9/2001 Schubert et al.
6,561,676 B1 5/2003 Fischer et al.
2005/0227536 A1* 10/2005 Gamache et al. ........... 439/607

* cited by examiner

*Primary Examiner*—Renee Luebke
*Assistant Examiner*—Mary Zettl
(74) *Attorney, Agent, or Firm*—James E. Cole; Middleton Reutlinger

(57) ABSTRACT

A recessed downlight mounting fixture having a fixture plate formed from a blank, the fixture plate having at least one aperture for receiving a lamp housing, a junction box formed from said the blank and foldably integral with said the fixture plate, at least one junction box door formed from the blank with the fixture plate, and, at least one mounting bar bracket formed from the blank.

33 Claims, 4 Drawing Sheets

RECESSED DOWNLIGHT MOUNTING FIXTURE

CROSS REFERENCE TO RELATED APPLICATION

Not applicable

STATEMENT REGARDING FEDERALLY SPONSORED RESEARCH OR DEVELOPMENT

Not applicable

REFERENCE TO SEQUENTIAL LISTINGS, ETC.

Not applicable

BACKGROUND

1. Field of the Invention

The present invention relates to a recessed downlight mounting FIXTURE. More specifically, the present invention relates to recessed downlight mounting fixture comprising a plurality of parts defining an assembly which are simultaneously formed from a single tooling.

2. Background of the Invention

Recessed downlighting has been ever increasing in popularity for use in both commercial and residential structures and as a result, competition has increased dramatically in this lighting area. To that end, manufacturers continue to search for ways to decrease costs for manufacturing and assembly in order to increase profits and decrease consumer costs.

Current recessed lighting frames are assembled utilizing various parts which are typically formed in separate manufacturing procedures and by separate tooling devices. Since the parts are formed separately, the material costs are expensive due to the large amounts of waste generated in producing each part separately. As a result, the costs for manufacturing includes a large amount of wasted material as each part is formed separately and adds to the overall cost of purchasing the parts. In addition, separate tooling costs associated with forming parts separately further increase costs associated with manufacturing and therefore purchase of a recessed downlight. Further, the parts which may be manufactured separately must be shipped to a single location for manufacturing.

Given the foregoing deficiencies, it will be appreciated that a recessed downlight mounting fixture is needed which is formed by a single tooling and from a single blank layout which therefore minimizes wasted material.

SUMMARY OF THE INVENTION

With regard to the foregoing, the present invention eliminates the oversights, difficulties, and disadvantages of the prior art by providing a recessed downlight mounting fixture.

An object of the present invention is to provide a recessed downlight mounting fixture assembly formed of various parts.

An additional object of the present invention is to provide a downlight mounting fixture defined by an assembly of various parts formed by a single tooling.

Another object of the present invention is to optimize use of material during forming of the recessed downlight mounting fixture by forming as many parts as possible from a blank layout.

Another object of the present invention is to form a junction box foldably integral with a fixture plate.

According to the present invention, a recessed downlight mounting fixture is provided comprising a fixture plate formed from a blank, the fixture plate having at least one aperture for receiving a lamp housing. A junction box is also formed from the blank and foldably integral with the fixture plate by folding opposed side walls, opposed sections defining an upper wall, and further fastening the opposed sections.

The invention further comprises at least one junction box door formed from the blank with the fixture plate and, at least one mounting bar bracket formed from the blank. The apparatus further comprises offset tabs extending from opposed sides of the fixture plate. In the blank layout, each of the offset tabs are surrounded by at least one mounting bar bracket. Further, one of the at least one mounting bar brackets is fastened to each of the offset tabs when the offset tabs are folded to an operating position. The aperture for receiving the lamp housing is adjacent the junction box and the fixture plate includes a plurality of bosses. The recessed downlight mounting fixture is formed by a single tooling.

The present invention further comprises a process for forming a recessed downlight mounting fixture frame, comprising the steps of positioning a blank in a single tooling, forming a fixture plate with the single tooling, extruding the fixture plate to define an aperture, punching at least one junction box door, and mounting bar brackets from the blank; and, folding a junction box integral with the fixture plate from said blank. The method further comprises the step of forming offset tabs on said fixture plate wherein mounting bar brackets are integral with the offset tabs. The method further comprises the step of forming a plurality of bosses in the fixture plate.

DETAILED DESCRIPTION OF THE PREFERRED EMBODIMENTS

Referring now in detail to the drawings, wherein like numerals indicate like elements throughout the several views, there are shown in FIGS. 1 through 4 various aspects of a recessed downlight mounting fixture both before and after manufacture. The fixture includes a fixture plate and various assembly parts all formed from a single tooling and a single sheet of material or blank in order to improve efficiency, reduce waste, and reduce cost of materials utilized in manufacturing the mounting fixture.

Figure 1:
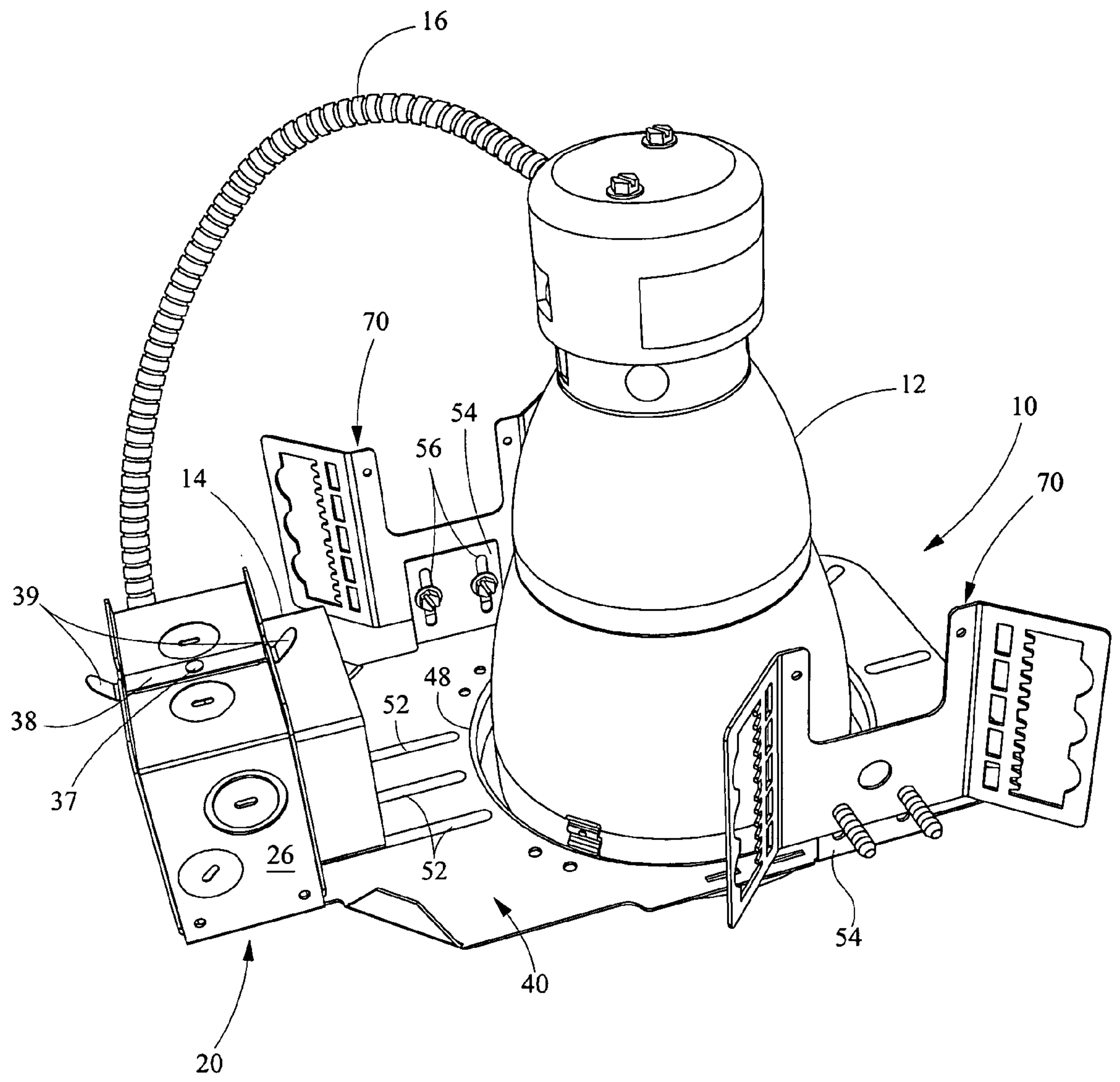
FIG. 1 is a perspective view of the recessed downlight mounting fixture.

Referring initially to FIG. 1, a perspective view of the complete recessed downlight mounting fixture 10 is depicted. The fixture or rough-in section 10 is shown including a lamp housing 12, ballast 14 and a conduit 16 extending between the lamp housing 12 and a junction box 20 connected to the ballast 14. The ballast 14 provides power for the lamp (not shown) within the lamp housing 12. The downlight mounting fixture 10 may be positioned within a ceiling of a room in order to provide useable downlight as well as reduce glare seen by those utilizing the room. The fixture 10 may be formed of a single sheet of formable metallic material such as steel or aluminum.

Figure 2:
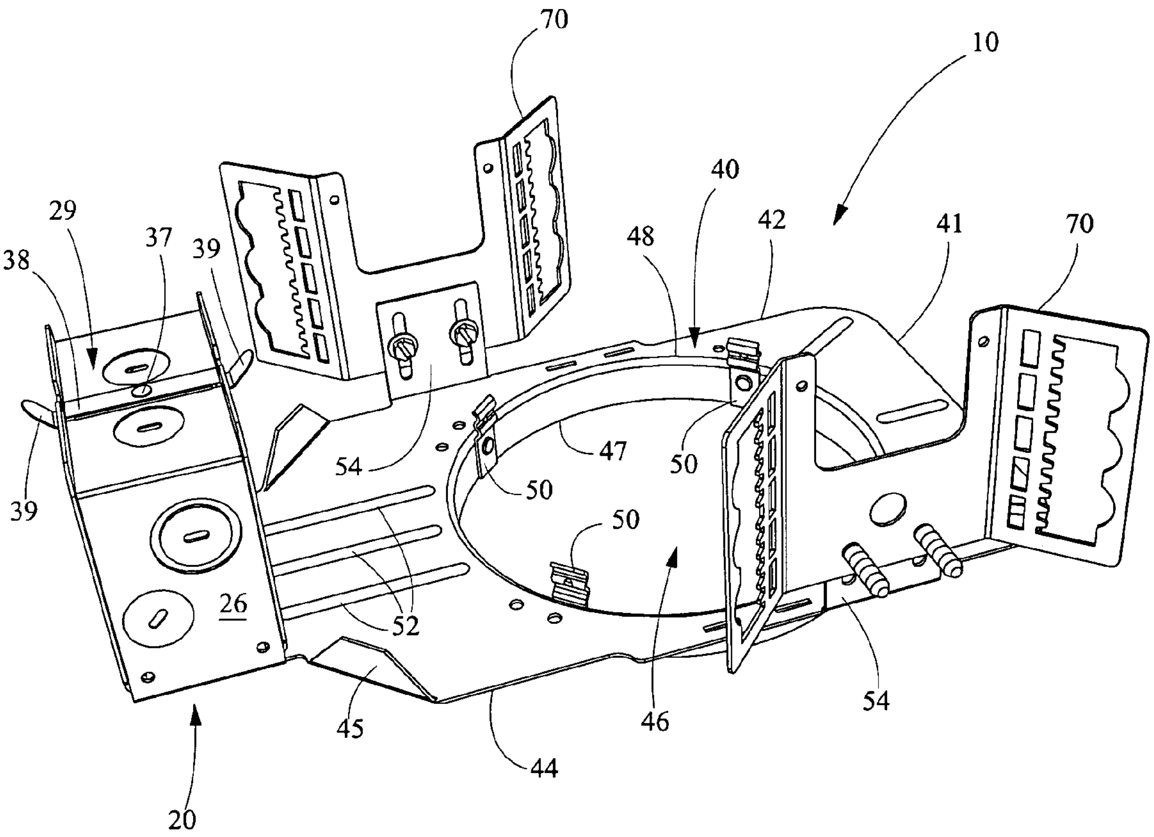
FIG. 2 is a perspective view of the recessed downlight mounting fixture of FIG. 1, with the lamp housing removed.

As shown in FIG. 2, the fixture 10 is depicted without the lamp housing 12, ballast 14, and conduit 16 and for purpose of this description the fixture 10 should hereinafter be understood not to include the ballast 14, lamp housing 12, and conduit 16, all shown in FIG. 1 as these parts are formed separately and therefore do not pertain to the formation of assembly parts from a single tooling and a single blank as in the present design. The rough-in section 10 comprises a junction box 20 formed integral with a fixture plate 40, and mounting bar brackets 70 which are integrally formed from a single sheet of material or blank, such as, for instance, a metallic sheet.

Figure 3:
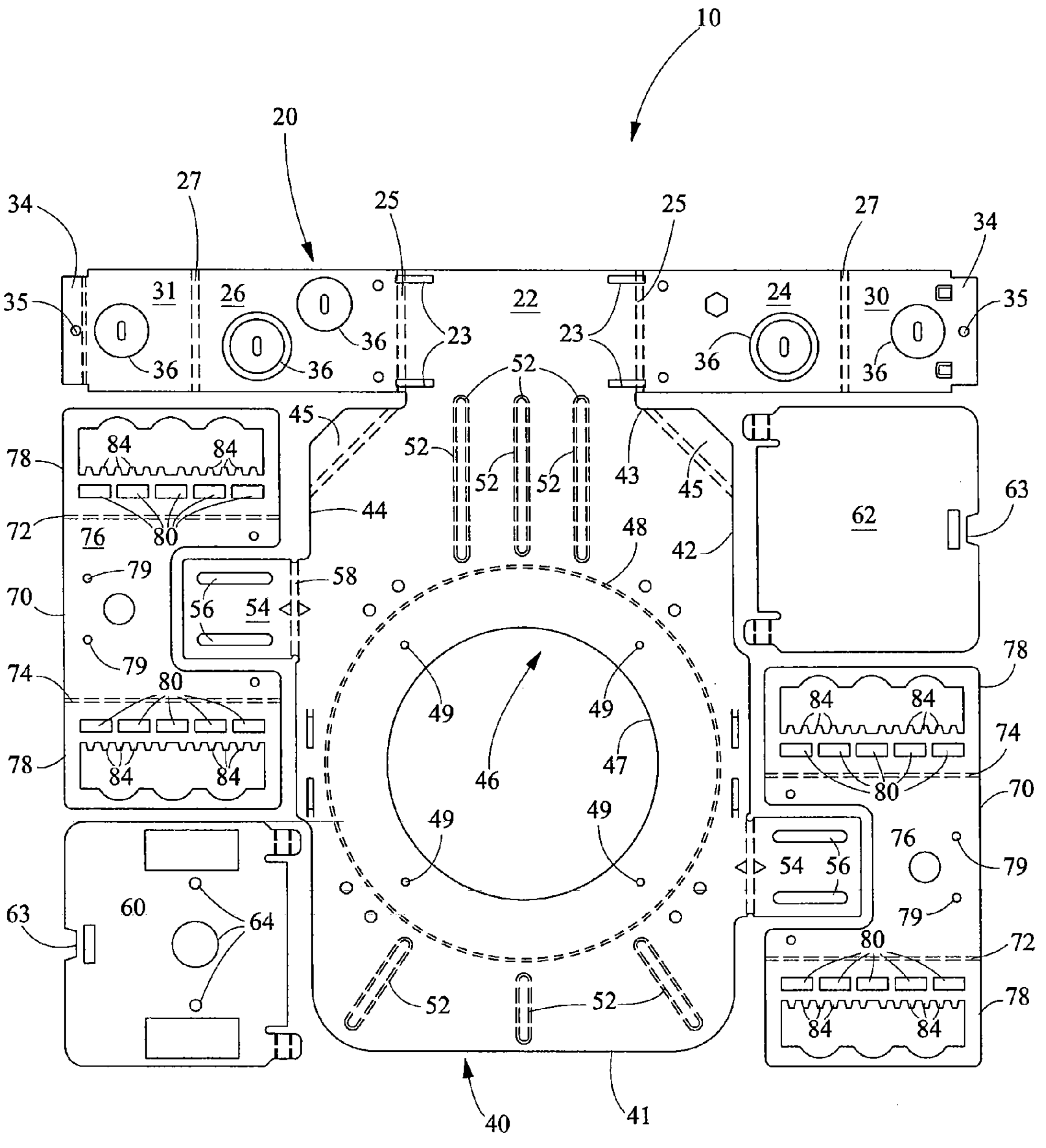
FIG. 3 is a plan view of the recessed downlight mounting fixture of FIG. 2 on a blank layout prior to manufacture.

Referring now to FIGS. 2–3, the fixture plate 40 is substantially rectangular in shape having opposed sides 42, 44 extending between ends 41,43. Although the shape depicted herein is substantially rectangular, various shapes may be utilized wherein the lamp housing 12 may be positioned. Within the plate 40 is a central aperture 46 defined by a score line 48. During manufacture, a tooling machine extrudes material radially inward of the score line 48 downward enlarging the aperture 46 from the design shown in FIG. 3 to that shown in FIGS. 1 and 2 define the aperture edge 46 and a receiving area for the lamp housing 12. Located along the vertical face of the material defining the receiving aperture are a plurality of fastening apertures 49 to which clips 50 may be fastened. The clips 50 are utilized to retain the lamp housing 10 within the plate aperture 46 and may be manufactured separately or stamped from the single blank depicted in FIG. 3. The fastening apertures 49 should be formed after the extrusion process in order to inhibit elongation of the fastening apertures 49 which would occur during extrusion if the apertures were formed before extrusion.

The fixture plate 40 also comprises a plurality of bosses 52 therein to provide strength and rigidity. The inventors have found that it is preferable to utilize lightweight materials to form the fixture plate 40 and that due to the lightweight material utilized to form fixture 10 and the plurality of stamping, cutting, and folding processes performed by the tooling, the fixture plate 40 may be susceptible to bending or breaking if the bosses 52 are not formed in the plate 40. Thus, the bosses 52 are positioned in locations of high stress during manufacturing operations. Further, corners 45 located along the end 43 and adjacent the junction box 20 may be folded in order to provide additional strength to the downlight mounting fixture 10.

Extending from opposed sides 42,44 of the fixture plate 40 and foldably integral therewith are first and second mounting bracket tabs 54. The tabs 54 may have a polygonal shape and, as shown in FIGS. 1–3, may be substantially square in shape. Alternatively however, various shapes may be substituted in order to define the tabs 54. Extending through each surface of tab 54 is at least one slot 56 providing an adjustable connection for the mounting bar brackets 70. The present illustrative embodiment utilizes two parallel slots 56 to inhibit rotation of the mounting bar brackets 70 relative to the tabs 54 when fastened. Extending through the at least one slot 56 may be at least one fastener for connecting the tabs 54 to the mounting bar bracket 70. Along an inner edge of the tab 54 directly adjacent the fixture plate 40 is a tab score line 58 defining a boundary between the fixture plate 40 and the tab 54 along which the tab 54 may be folded from its flat position in FIG. 3 to a position which is substantially perpendicular to the upper surface of the fixture plate 40 as seen in FIGS. 1 and 2. In this orientation, the tab 54 may receive the mounting bar bracket 70 described further hereinafter.

Referring now to FIG. 3 wherein a plan view of a blank layout is depicted, one of ordinary skill in the art should recognize that the tabs 54 are not positioned directly opposite one another but instead are formed in an offset manner extending from the sides 42,44 of the fixture plate 40. In order to reduce waste and utilize the sheet material more efficiently, the tabs 54 are formed offset from one another. The opposed offset tabs 54 are formed within a portion of each mounting bar bracket 70. If the mounting bar brackets 70 were formed in the center of sides 42,44, allowing the tabs 54 to be centrally positioned, then there would not be enough room available on either side of the mounting bar bracket 70 for forming the front and rear junction box doors 60,62 without utilizing a larger piece of blank material. Thus the tabs 54 are offset since the mounting bar brackets 70 must be offset in order to provide room for the front and rear junction box door 60,62. As a result all of the parts may be formed from a single tooling.

Referring still to FIG. 3, at a first end of the fixture plate 40 the junction box 20 comprises a bottom wall 22, opposed side walls 24,26 and an upper wall 29 defined by two opposed sections 30,31 defining front and rear openings. The junction box 20 is foldably integral with the fixture plate 40 so that the junction box 20 is folded into form and integral with the fixture plate 40. The bottom wall 22 is substantially rectangular in shape and contains a plurality of door tab apertures 23. The bottom wall 22 may be distinguished from each opposed sidewall 24,26 by a score line 25 located at an inner edge of the sidewalls 24,26 and along which the opposed sidewalls 24,26 may be folded upward substantially perpendicular to the bottom wall 22. At an outer edge of each sidewall 24,26 are score lines 27 allowing for folding of each opposed section 30,31 defining the upper wall 29.

The two opposed sections 30,31 each include an outwardly extending flange 34 so that as the opposed sections 30,31 are folded toward one another, the flanges 34 are aligned and a fastener may be positioned through a fastening apertures 35 in each flange 34. In order that the junction box 20 have an aesthetically pleasing smooth upper wall 29, one of the flanges 34 may be vertically offset from the other so that the upper flange 34 is even with the opposite opposed section and the upper wall 29 is flat without projections when the junction box 20 is formed.

Once the opposed sections 30,31 are folded and flanges 34 aligned to form upper wall 29, a door arm 38 having first and second detents 39 at distal ends of the arm 38 is positioned across on the upper wall 29 so that the detents 39 aid in retaining junction box doors 60,62 on the junction box 20. The door arm 38 has an aperture therein which is aligned with the fastening apertures 35 of flanges 34. A fastener 37, for instance a rivet or screw, is positioned through the fastening apertures 35 to retain the shape of the junction box 20. Once the junction box 20 is formed the front and rear openings are covered with junction box doors 60,62. Within the slots 23 are tabs 64 located along an edge of the junction box doors 60,62 to position the lower edge of the junction box doors 60,62. As shown in FIGS. 1 and 2, the detents 39 retain the upper edge of the doors 60,62 in place. Although the detents 39 retain junction box doors 60,62 in place, the arm 38 may be urged out of contact with the doors 60,62 in order to release and remove the doors 60,62 thereby providing access to the inner portion of the junction box 20. In order to urge the door arm 38 upward, the distal ends are forced upward which slightly deforms the door arm 38 and moves the detents 39 clear of doors 60,62 so that the junction box doors 60,62 may be removed or replaced. After the doors 60,62 are removed, or are replaced, the force on the distal ends of door arm 38 is removed and the door arm 38 returns to its original shape.

Referring still to FIGS. 1–3, the sidewalls 24,26 and the upper wall 29 each may have at least one knockout 36 therein to provide a plurality of paths for electrical wires and conduit to move from within the junction box 20 to the lamp housing 12.

The junction box 20 further comprises a front junction box door 60 and a rear junction box door 62. As shown in FIG. 3, the front and rear doors 60,62 are substantially square in shape but may be rectangular or some other geometry according to the shape of the junction box 20 openings defined by the junction box 20. Junction box doors 60,62 are formed on opposite sides of the fixture plate 40 and each door is positioned between the junction box 20 and mounting bar brackets 70 on the blank as depicted in FIG. 3. The junction box doors 60,62 each have a notch 63, allowing first and second detents 39 to pass there through when the detents 39 are raised, but maintaining contact with the detents 39 when the doors 60,62 are in the closed position. The doors 60,62 also each have at least one tab 64 extending from a lower edge thereof. The tabs 64 are positioned within tab apertures 23 in the bottom wall of the junction box 20 so that the doors 60,62 extend upwardly from the bottom wall closing the front and rear openings. Consequently, as previously described the doors 60,62 are retained in place at the lower end by engagement of tabs 64 and slots 23 while the upper end of the doors 60,62 are retained by detents 39.

The front door 60 also includes at least one knockout or aperture 64 which may be used to fasten the ballast 14 to the junction box door 60. As depicted in FIG. 3, the front junction box door 60 may include three apertures which may or may not vary in size. In addition at least one aperture or knockout 64 may be used as a path for electrical wire to extend from the ballast 16 to the inner portion of the junction box 20 and through the conduit 16.

Figure 4:
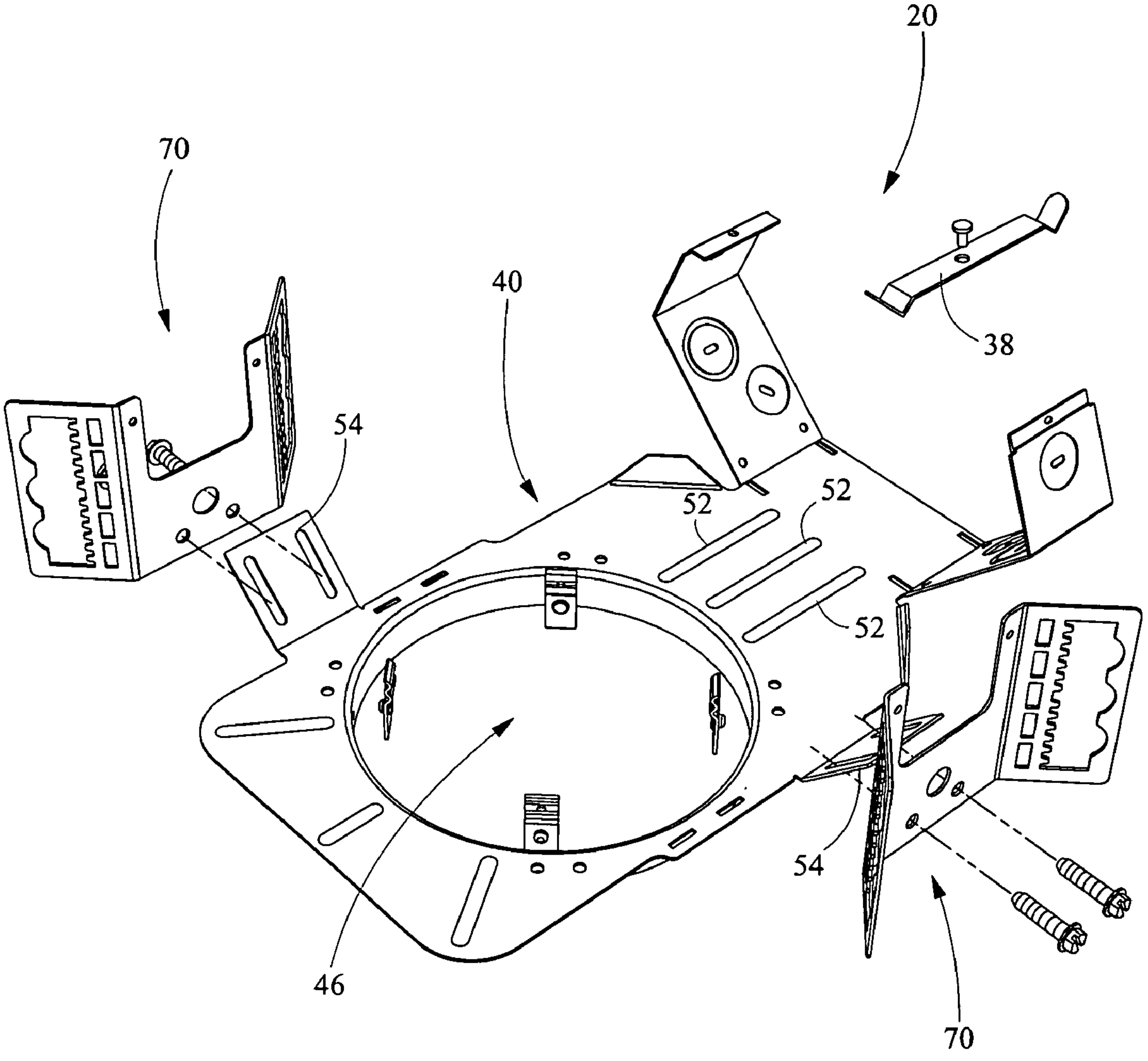
FIG. 4 is an exploded perspective view of the recessed downlight mounting fixture of FIG. 2.

The mounting bar brackets 70 are also stamped from the unitary sheet or substrate used to produce the parts of the present invention. The mounting bar brackets 70 are substantially U-shaped as seen in FIG. 3, having a central body portion 76 and ears 78 adjacent each side of the central body portion such that the tabs 54 are formed adjacent the mounting bar brackets 70 within the open portion of the brackets 70. The brackets 70 each comprise first and second score lines 72,74 along which ears 78 may be folded at some angle to the body portion 76 as shown in FIGS. 1,2, and 4. Also located in the central body portion 76 is at least one fastening aperture 79 which, as shown in FIGS. 1 and 2, is aligned with the at least one slot 56 in order to adjustably fasten the mounting bar bracket 70 to the tabs 54. According to the present invention, the mounting bar bracket 70 has two apertures 79 and the tabs 54 have two corresponding slots 56 in order to provide better connection and increase lateral stability of the mounting bar bracket 79 with respect to the tabs 54.

Referring to FIGS. 1–3, the ears 78 each have at least one opening 80 through which mounting bars (not shown) may pass for mounting between ceiling studs, joists, beams, or other structural members. As shown in FIGS. 1 and 2, when the mounting bar brackets 70 are mounted to the tab 54, the plurality of openings 80 provide for a first level of vertical adjustment of the mounting bars (not shown). Additionally the vertical movement between the tabs 54 and the mounting bar bracket 70 provides a second level of vertical adjustment. A second aperture 82 is shown comprising three semi-circular cut-away portions and a plurality of teeth 84 along an opposed edge. The aperture 82 provides a location where conduit may be positioned there through. The semi-circular portions allow the installer to vary the positioning of the conduit while the teeth 84 grasp or engage the conduit inhibiting slipping of the conduit from the opening 82. In other words, the conduit is retained in place.

As shown in FIGS. 3 and 4, the mounting bar brackets 70 are stamped separately from the tabs 54 and are attached to the tabs 54 using fasteners. According to an alternative embodiment, the mounting bar brackets 70 may be attached to the tabs 54 so that when the tabs 54 are folded upward, the mounting bar brackets 70 are positioned for installation. In this alternative embodiment, the lack of fasteners between the tabs 54 and mounting bar brackets 70 eliminate the vertical adjustability between the tabs 54 and the mounting bar brackets 70. However, this design also eliminates extra parts and results in a design which is very simple to use and install.

Referring now to FIG. 4, the present invention is shown in an exploded perspective view of the fixture plate during assembly. The junction box 20 is formed by folding of the sidewalls 24,26 and upper wall opposed sections 30. FIG. 4 also depicts the tabs 54 being folded upward prior to attachment of mounting bar brackets 70. The mounting bar brackets are shown with ears 78 disposed at an angle to the body 70. The fixture plate 40 is also shown with the central aperture 46 for receiving a lamp housing (not shown). Thus FIG. 4 clearly depicts how the recessed downlight mounting fixture 10 is formed from the blank depicted in FIG. 3. In this respect the assembly is shown being formed from a single sheet.

During manufacture, a blank is stamped and formed by a single tooling unit. During the multiple step process, the blank is hit with various tooling cycles so that the junction box doors 60,62, and the mounting bar brackets 70 and aperture 46 and other apertures are formed from the blank. As the parts are formed during this cutting process, the parts are generally retained to the fixture plate 40 by webs until the assembly begins. Also, the lamp housing aperture 46 is extruded and fastening apertures 49 are subsequently formed. Next, some of the parts must be folded or bent such as the mounting bar brackets 70, corner pieces 45, junction box 20, and tabs 54. Finally, assembly occurs wherein the arm 38 is fastened to the junction box 20 and the mounting bar brackets 70 are fastened to the tabs 54.

More specifically the method for forming a recessed downlight mounting frame, comprising the steps of positioning a blank in a single tooling, forming a fixture plate with the single tooling, extruding the fixture plate 40 to define an aperture 46, punching at least one junction box door 60,62 and mounting bar brackets 70 from the blank; and, folding a junction box 20 integral with the fixture plate 40 from said blank. The method further comprises the step of forming offset tabs 54 on said fixture plate 40 wherein mounting bar brackets 70 are integral with the offset tabs 54. The method further comprises the step of forming a plurality of bosses 52 in the fixture plate 40.

It is apparent that variations may be made to the recessed downlight mounting fixture of the present invention in regards to specific design elements thereof. Such variations however are deemed to fall within the teachings of the present invention as generally modifications may be made to placement of the particular structure described herein while falling within the general teachings hereof.

I claim:

1. A recessed downlight mounting fixture, comprising:
- a fixture plate formed from a blank, said fixture plate having at least one aperture for receiving a lamp housing therethrough;
- a junction box formed from said blank and foldably integral with said fixture plate;
- at least one junction box door formed from said blank with said fixture plate; and,
- at least one mounting bar bracket formed from said blank.

2. The recessed downlight mounting fixture of claim 1 further comprising offset tabs extending from opposed sides of said fixture plate.

3. The recessed downlight mounting fixture of claim 2, each of said offset tabs being surrounded by said at least one mounting bar bracket on said blank.

4. The recessed downlight mounting fixture of claim 2, one of said at least one mounting bar brackets fastened to each of said offset tabs.

5. The recessed downlight mounting fixture of claim 2, said offset tabs being folded to an operating position from a blank layout.

6. The recessed downlight mounting fixture of claim 1, said at least one aperture for receiving said lamp housing being adjacent said junction box.

7. The recessed downlight mounting fixture of claim 1, said recessed downlight mounting fixture formed from a single tooling.

8. The recessed downlight mounting fixture of claim 1, said fixture plate having a plurality of bosses.

9. The recessed downlight mounting fixture of claim 1, wherein said at least one junction box door is two junction box doors.

10. The recessed downlight mounting fixture of claim 1 wherein said at least one mounting bar bracket is two mounting brackets.

11. The recessed downlight mounting fixture of claim 10 wherein each of said two mounting bar brackets are formed about an opposed offset tab.

12. The recessed downlight mounting fixture of claim 1, said junction box defined by foldable opposed side walls and an upper wall defined by opposed sections.

13. The recessed downlight mounting fixture of claim 12, said junction box formed by folding said opposed side walls and said opposed sections and further fastening said opposed sections.

14. The recessed downlight mounting fixture of claim 12, said junction box having a plurality of knockouts in said opposed side walls and said upper wall.

15. A recessed downlight mounting fixture, comprising:
- a fixture plate having at least two opposed sides and an end;
- first and second offset tabs extending from said opposed sides;
- first and second mounting bar brackets formed integral with said fixture plate and adjacent said tabs;
- a junction box foldably integral with said end of said fixture plate;
- wherein said fixture plate, said mounting bar brackets, and said junction box are formed by a single tooling.

16. The recessed downlight mounting fixture of claim 15, said mounting bar brackets having ears extending from said a body portion.

17. The recessed downlight mounting bracket of claim 16, said ears having a plurality of mounting bar apertures.

18. The recessed downlight mounting bracket of claim 17, said mounting bar apertures providing for vertical adjustment of mounting bars.

19. The recessed downlight mounting bracket of claim 16 further comprising conduit apertures in said ears.

20. The recessed downlight mounting bracket of claim 15, further comprising a lamp housing aperture extruded through said fixture plate.

21. The recessed downlight mounting fixture of claim 20, said fixture formed in a multi-step process by said single tooling.

22. A blank layout for a recessed downlight mounting fixture, comprising:
- a fixture plate having offset tabs extending from opposed sides of said fixture plate;
- first and second mounting bar brackets positioned adjacent said offset tabs in said blank layout;
- at least one junction box door adjacent said mounting bar brackets on said blank;
- a junction box foldably integral with said fixture plate;
- said fixture plate, said at least one junction box door, said mounting bar brackets, and said junction box formed from said blank.

23. The recessed downlight mounting fixture of claim 22, said frame, said at least one junction box door, said mounting bar brackets, and said junction box formed by a single tooling.

24. The recessed downlight mounting fixture of claim 22, said frame, said at least one junction box door, said mounting bar brackets, and said junction box formed during a multiple stage process by a single tool.

25. A process for forming a recessed downlight mounting fixture, comprising the steps of:
- placing a blank in a tooling device;
- making a plurality of tooling cuts to form various assembly parts from said blank;
- retaining said assembly parts on said blank by webs located between said parts; and,
- extruding a lamp housing aperture from said blank.

26. The process of claim 25 further comprising the step of folding various parts on said blank to form a junction box.

27. The process of claim 26 further comprising the step of folding ears on said mounting bar bracket.

28. The process of claim 27 further comprising the step of folding tabs disposed on sides of said fixture plate.

29. A recessed downlight mounting fixture, comprising:
- a fixture plate formed from a blank, said fixture plate having at least one extruded
- aperture for receiving a lamp housing therethrough;
- a junction box formed from said blank and foldably integral with said fixture plate;
- at least one junction box door formed from said blank with said fixture plate; and,
- at least one mounting bar bracket foldably integral with said blank.

30. A method for forming a recessed downlight mounting frame, comprising the steps of:
- positioning a blank in a single tooling;
- forming a fixture plate with said single tooling;
- extruding said fixture plate to define an aperture for receiving an enclosure therethrough;
- punching at least one junction box door and mounting bar brackets from said blank; and,
- folding a junction box integral with said fixture plate from said blank.

31. The method of claim 30 further comprising the step of forming offset tabs on said fixture plate.

32. The method of claim 31 said mounting bar brackets being integral with said offset tabs.

33. The method of claim 30 further comprising the step of forming a plurality of bosses in said fixture plate.

* * * * *